ABSTRACT

United States Patent
Koral et al.

[15] 3,663,389
[45] May 16, 1972

[54] METHOD OF ELECTRODEPOSITING NOVEL COATING

[72] Inventors: Jerry Norman Koral; Werner Joseph Blank, both of Stamford, Conn.

[73] Assignee: American Cyanamid Company, Stamford, Conn.

[22] Filed: Apr. 17, 1970

[21] Appl. No.: 29,703

Related U.S. Application Data

[63] Continuation of Ser. No. 684,467, Nov. 20, 1967, abandoned.

[52] U.S. Cl. .................................................... 204/181
[51] Int. Cl. ...................................................... C23b 13/00
[58] Field of Search .................................................. 204/181

[56] References Cited

UNITED STATES PATENTS 3,449,228  6/1969  Yurcheshen et al. ..................204/181
3,450,660  6/1969  Sekmakas ............................204/181
3,471,388  10/1969  Koral ..................................204/181

Primary Examiner—Howard S. Williams
Attorney—Harry H. Kline

[57] ABSTRACT

A process for electrocoating metal comprising immersing said metal in an aqueous dispersion of a mixture of from about 5 percent to about 40 percent, by weight, of (A) a mixture of substantially water-insoluble, substantially fully etherified tetramethylol guanamines and correspondingly from about 95 percent to about 60 percent, by weight, of (B) a water dispersible non-gelled polymeric material carrying an ionic charge which is heat reactive with (A) wherein said percentages by weight, total 100 percent and are based on the total solids weight of (A) and (B), and subjecting the aqueous dispersion to electrophoresis in order to deposit the mixture of (A) and (B) on the metal as an adherent film, is disclosed.

6 Claims, No Drawings

METHOD OF ELECTRODEPOSITING NOVEL COATING

CROSS-REFERENCE TO RELATED APPLICATIONS

This application is a continuation of our copending application, Ser. No. 684,467, filed Nov. 20, 1967 now abandoned and directed to Novel Electrodeposition Coatings.

BACKGROUND OF THE INVENTION

We have found a composition of matter comprising an aqueous dispersion of a mixture of a plurality of substantially water-insoluble, substantially fully etherified tetramethylol guanamines and a water dispersible, non-gelled polymeric material carrying an ionic charge, namely, either cationic or anionic charges, which is heat reactive with said etherified tetramethylol guanamines which novel compositions can be applied to metals by use of an electrodeposition technique.

DESCRIPTION OF THE PRIOR ART AND SUMMARY

For a number of years, the methods used in painting metallic articles having irregularly shaped surfaces have included hand or automatic spray painting, electrostatic painting, brushing, or dipping. Electrophoretic techniques have been utilized in coating articles having a relatively small surface area, but these techniques have been restricted to the application of special coating materials. The present methods of applying a surface coating on large metallic articles have resulted in the waste of relatively large amounts of the coating due to overspraying or due to the accumulation of excess paint material along certain surfaces of the coated articles. Additionally, these coating techniques have usually resulted in a relatively poor surface finish to the article being coated due to uneven distribution of paint or due to surface blemishes. Additionally, prior methods for applying a coating onto comparatively large metal articles has been the fact that it is rather difficult to obtain a relatively uniform film of paint over the entire surface of the metal article. Also, generally many of the metal surfaces are not readily accessible to the application of the coating material which results in an unsatisfactory or spotty coating. Recessed areas such as the rocker panels of automobiles have only been coated by the prior art techniques at considerable expense because of the requirements of special coating techniques or special hand labor operations in order to obtain at least a minimum measure of protective coating against corrosion. The technique of dipping the metallic article in a paint bath to obtain a coating on recessed surfaces of a metallic article has not proven satisfactory since the evaporation of solvents from the paint film has resulted in the washing off a portion of the adhered paint coating.

We have now discovered a composition of matter which can be used effectively in the coating of metallic articles by use of an electrophoretic technique which will provide a substantially uniform coating on all surfaces being treated.

Furthermore, our novel compositions, when electrodeposited and heat cured, are resistant to detergents and also exhibit an excellent resistance to salt sprays, a problem which has been plaguing the automotive industry for years.

Reference is made to the article entitled "Electrodeposition: Theory and Practice," by Glover et al. in the Official Digest, Feb. 1965, pages 113-128, inclusive. Attention is also directed to the British Pat. No. 933,175 which was published on Aug. 8, 1963 entitled "Improvements in a Electrophoretic Coating Process." Each of these references is incorporated herein by reference.

DESCRIPTION OF THE INVENTION INCLUDING PREFERRED EMBODIMENTS

In the compositions of the present invention, there is blended a mixture of various substantially water-insoluble, substantially fully etherified tetramethylol guanamines which contain at least 13 carbon atoms exclusive of those three (3) carbon atoms in the triazine ring, and a water dispersible, non-gelled polymeric material carrying an ionic charge which is heat reactive with said guanamine compounds. These two principal components are blended in an aqueous solvent. The dispersion medium may consist of water alone or may contain additional solvents but, generally, water should be the preponderant member of the dispersion medium and, for economic reasons, the other possible solvents that could be used with water are omitted unless they are designed to serve some special function.

The component (A) is a mixture of substantially water-insoluble, substantially fully etherified tetramethylol guanamines which have anywhere from one alkoxymethyl group, to four alkoxymethyl groups or any combination of 1–4 of the same or different alkoxymethyl groups, wherein said alkoxy radicals can possess from 1-8 carbon atoms, inclusive.

The guanamine compounds useful in our novel compositions are represented by the formula

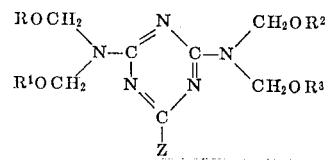

wherein R, $R^1$, $R^2$ and $R^3$ are the same or different alkyl radicals of one–eight carbon atoms, inclusive, and Z is hydrogen, an alkyl radical of one–eight carbon atoms, inclusive, or an aryl radical.

As mentioned above, the guanamine compound used must contain at least 13 carbon atoms exclusive of those in the triazine ring. We have found that if there are less than 13 carbon atoms in the guanamine compound it is too hydrophilic, i.e. not sufficiently hydrophobic, to migrate to the electrode during the electrodeposition process.

That is to say, during the electrodeposition process, the guanamine compound, which has no charge, migrates to the electrode by association with the polymer which does possess a charge. If the guanamine is hydrophobic it will associate with the polymer and to be hydrophobic it must contain the above discussed amount of carbon atoms therein.

These etherified methylol guanamines are not considered to be resinous materials since they are, as individual entities, non-polymeric compounds. They are, however, potential resin-forming compounds which enter into chemical reaction or association with certain ionic, water dispersible, non-gelled polymeric materials when subjected to heat and particularly when subjected to heat under acidic conditions. The concept of the degree of alkylation on the average, will be discussed here in order that this concept may be more fully understood.

Theoretically, it is possible to methylolate guanamine fully, that is, to produce tetramethylol guanamine. However, frequently a composition purporting to be tetramethylol guanamine, when analyzed shows a fractional degree of methylolation. It is well recognized that fractional methylolation is not considered to be possible. As a consequence, when a composition containing, on analysis, a degree of methylolation of below 4.0, it has to be recognized that this is but an average degree of the methylolation of the guanamine compound and establishes logically that the aforementioned methylol composition is composed of a mixture of a preponderant amount of tetramethylol guanamine with comparatively minor amounts of trimethylol guanamine and perhaps insignificant amounts of such derivatives as dimethylol guanamine and even monomethylol guanamine. The same concept of averages is also applicable to the alkylation or etherification of the tetramethylol guanamine composition. There cannot be, based on present reasoning, a fractional alkylation and, as a consequence, when on analysis, a given composition shows that the degree of, for example, methylation is 0.5 and the degree of ethylation is correspondingly about 3.5 it must be concluded that there is present in such a composition some combination of trimethyl ether and triethyl ether. There may be present additionally some monoethyl ether, dimethyl ether of tetramethylol guanamine, or even some dimethyl ether, monoethyl ether of tetramethylol guanamine. As a consequence, the mixture of substantially water-insoluble, substantially fully etherified tetramethylol guanamines which have 1–4 alkoxymethyl groups, on the average, may contain any one of the following compounds and in varying amounts depending on the degree of methylation and the degree of different alkylation. Included in that group of compounds are the following: tetramethyl ethers of tetramethylol guanamines, dimethyl, diethyl ethers of tetramethylol guanamines, trimethyl monoethyl ethers of tetramethylol guanamines, monomethyl triethyl ethers of tetramethylol guanamines, and the like, including corresponding aceto, formo or propioguanamines and the like.

While the above discussion has been directed primarily to monomeric guanamines, it should be understood that such materials as dimers of the above guanamine compounds may also be utilized, alone or in admixture with the specified guanamines.

The amount of the mixture of substantially water-insoluble, substantially fully etherified tetramethylol guanamines used in the composition of the present invention will vary between about 5 percent and about 40 percent, by weight, based on the total weight of said etherified tetramethylol guanamines and the ionic, water dispersible, non-gelled polymeric material which is heat reactive with said guanamine compounds mixture Correspondingly, in the composition, there will be from about 95 percent to about 60 percent, by weight, of the ionic, water dispersible, non-gelled polymeric material which is heat reactive with said etherified tetramethylol guanamines, based on the total weight of said ionic, polymeric material and said mixture of the etherified tetramethylol guanamines. It should be apparent that all of the above percentages, by weight, will total 100 percent, by weight, and are based on the total solids weight of the guanamine compounds and said ionic, polymeric material. It is preferred to use between about 10 percent and about 30 percent, by weight, of the guanamine compounds and correspondingly from about 90 percent and 70 percent, by weight, of the said ionic, polymeric material, same basis.

The process for making a representative mixture of substantially water-insoluble, substantially fully etherified tetramethylol guanamines is set forth hereinbelow. This example is set forth primarily for the purpose of illustration and no specific enumeration of detail contained therein should be interpreted as a limitation on the claims except as is indicated in the appended claims. All parts are parts, by weight, unless otherwise indicated.

PREPARATION OF A MIXTURE OF METHYL ETHERS OF TETRAMETHYLOL GUANAMINE

To a reactor fitted with a stirrer, thermometer, and condenser were added 640 parts of methanol, 4 parts of 50 percent sodium hydroxide and 396 parts of 91 percent paraformaldehyde. The mixture was stirred, heated to 45° C., and held there for 15 minutes. Then, 364 parts of benzoguanamine were added and the dispersion heated to reflux. It was held at reflux for 90 minutes, cooled at 28° C., and 20 parts of 70 percent nitric acid were added over a 15 minute period. The batch was held at 28°–34° C. for 30 minutes and then neutralized with concentrated sodium hydroxide. The reaction mixture was concentrated to a final temperature of 65° C at 26 inch of vacuum. To this concentrate, 640 parts of methanol and 17 parts of 60 percent nitric acid were added and held at 32°–35°C. for 1 hour. This solution was neutralized with concentrated sodium hydroxide and vacuum concentrated to a final temperature of 103° C. at 26 inches of Hg. The filtered product had a Gardner-Holdt of $Z_6$–$Z_7$ and a foil solids of 100 percent.

The second component in the compositions of the present invention is a water dispersible, non-gelled, polymeric material carrying an ionic charge, or more precisely, either an anionic or cationic charge. These two classes of ionically charged materials will be discussed hereinbelow.

It is deemed advisable to engage in a discussion of these ionic, water dispersible, non-gelled, polymeric materials. It should be observed that it is not sufficient for the ionic, water dispersible, non-gelled, polymeric material to be only cationic or anionic. This non-gelled, polymeric material must, in addition to the aforementioned charge characteristic, also contain one or more reactive sites selected from the group consisting of carboxyl groups, alcoholic hydroxyl groups and amido groups in order to cross-link with the guanamine compounds used in the present invention. If the non-gelled, polymeric material contains carboxyl groups, it will be anionic but it will be capable of being converted to a cationic material by amination or by use of a cationic surfactant, which material will inherently be carrying with it the cross-linking sites for the guanamine compound. On the other hand, if the non-gelled, polymeric material is devoid of any carboxyl groups, but does contain alcoholic hydroxyl groups and/or amido groups, said polymeric material will be non-ionic but can be converted to an anionic material by carboxylating the polymeric material or by dispersing said polymeric material in water with an anionic surfactant. By the same token, if a non-gelled, water dispersible, polymeric material devoid of any carboxyl groups but containing alcoholic hydroxyl groups and/or amido groups were to be prepared, such material again, as before, would contain the necessary cross-linking sites but would, nevertheless, be a non-ionic polymeric material. If desired, such a non-ionic polymeric material may be converted to a cationic polymeric material by amination of the polymeric material with, for example, a primary, secondary or tertiary amine compound, a quaternary ammonium compound etc., or it could be dispersed in water with a cationic surfactant. The purpose for having the electric charge on the water dispersible, non-gelled, polymeric material is so that it will migrate to the anode in an electrophoretic system if an anionic material is present and will migrate toward the cathode if a cationic polymeric material is present. It will be apparent from the illustrative examples of the present invention that these charged polymeric materials move to their respective poles along with the guanamine compounds and become deposited thereon. After the deposition of the mixed polymeric material has been accomplished on the metal, the coated metal is then heat treated, preferably by baking, in order to accomplish the cross-linking between the guanamine compounds and the polymeric material containing the cross-linking sites that are heat reactive with the guanamine compounds. As used in an electrodeposition process, the bath of the aqueous compositions of the present invention should have a pH varying between about 1 and 11 and, preferably, between about 4 and 9. For the anionic compositions, the pH is controlled between about 6 and 11 and, preferably, between about 7 and 9 whereas the cationic material has a pH between about 1 to 8 and, preferably, about 4 to 7. Hereinbelow there is set forth a further discussion of these two classes of polymeric materials, namely, the anionic, water dispersible, non-gelled, polymeric materials which are heat reactive with the guanamine compounds and the cationic, water dispersible, non-gelled, polymeric materials that are heat reactive with the guanamine compounds.

The anionic, water dispersible, non-gelled, polymeric material used in the composition of the present invention may be any one of a plurality of polymeric materials which have reactive sites that are heat reactive with the etherified guanamine compounds. These reactive sites may be carboxyl groups and/or alcoholic hydroxyl groups and/or amido groups, which polymeric materials are the result of vinyl polymerization, epoxy polymerization etc. or are polyester compositions, or maleinized oils etc. These polymeric materials may be completely water soluble or they may be substantially water insoluble but capable of being dispersed in water. Sometimes it may be necessary to use appropriate surfactants to disperse these polymeric materials. The term "water dispersible,"

therefore, is intended to encompass both the aqueous solutions as well as dispersions in which the polymeric material may be suspended in the aqueous medium. These anionic polymeric materials may contain, as the sole reactive sites, carboxyl groups or alcoholic hydroxyl groups or amide groups, or they may, in fact, contain all three.

When polyester resins are used, they can be prepared by reacting a polycarboxylic acid including dicarboxylic acids with a polyhydric alcohol, including the glycols. The polycarboxylic acids may be either saturated, i.e., free of non-benzenoid unsaturation, or they may be $\alpha,\beta$-ethylenically unsaturated.

If the polyester resins used contain preponderant amounts of the polycarboxylic acid, such polyester should be reacted until an acid number of not less than about 35–40 is reached and, preferably, to an acid number of between about 50–150. If the polyester resin is prepared by using a preponderance of alcoholic hydroxyl groups, the ingredients forming the polyester should not be permitted to react until a hydroxyl number of not less than about 35–40 is reached and, preferably, between about 50 and 150.

When the anionic polymeric materials are prepared and dispersed in water, they may be rendered alkaline by adjusting the pH to a point above 4 to about 11 and, preferably, to a pH above about 7.1 to about 9. This adjustment of the pH is accomplished on the anionic polymeric material before the etherified tetramethylol guanamine compounds are added and then, if necessary, the pH is readjusted to a point within the ranges set forth hereinabove.

The maleinized oils which may be used are water soluble or water dispersible and are generally prepared by reacting unsaturated glyceride oils with an acid or anhydride dienophile such as maleic anhydride. Other acids or anhydride dienophile have also been used and these include acrylic acid, crotonic acid, and the like. These water solubilized oils were discussed by J. J. Hopwood at the Sixth Australian Convention, Warburton, 16–19, July 1964, and a paper has been published entitled "Water Soluble Thermosetting Organic Polymers" in the Journal of the Oil and Color Chemists Association, Feb. 1965, pages 157–171, inclusive, which reference is incorporated herein by reference.

All of these anionic, water dispersible, non-gelled polymeric materials having carboxyl groups and/or alcoholic hydroxyl groups and/or amide groups have water sensitive sites, obviously, by virtue of the presence of these groups, and these water sensitive sites should all be tied up by interreaction with the etherified tetramethylol guanamine compounds in a cross-linking mechanism. Before the cross-linking takes place, the guanamine compounds also function as plasticizers for the total composition.

The anionic, polymeric materials prepared by vinyl polymerization may be prepared in either an aqueous solution, an organic solvent, or in an aqueous emulsion system. All of these procedures are thoroughly well-known in the art and it is not deemed necessary to elaborate on such procedures here.

The vinyl polymers may be prepared by polymerizing polymerizable monomers such as acrylic acid, methacrylic acid, crotonic acid, cinnamic acid, $\beta$-benzoyl acrylic acid, and polycarboxylic acids of the $\alpha,\beta$-ethylenically unsaturated class such as maleic, fumaric, itaconic, mesaconic, ataconic, or the halogenated acids such as halogenated maleic or, more specifically, chloromaleic acid, and the like. These acidic materials may be copolymerized or polymerized with other monomers which contain no carboxyl groups such as methyl acrylate, ethyl acrylate, propyl acrylate, butyl acrylate, octyl acrylate, decyl acrylate, lauryl acrylate, methyl methacrylate, ethyl methacrylate, butyl methacrylate, heptyl methacrylate, decyl methacrylate, propyl crotonate, butyl crotonate, nonyl crotonate, and the like. Still further, one could use such copolymerizable compounds as styrene, ortho, meta- or para-alkyl styrenes such as the o-, m- or p-methyl, ethyl, propyl and butyl styrenes, 2,4-dimethyl styrene, 2,3-dimethyl styrene, 2,5-dimethyl styrene, vinyl naphthenate, acrylonitrile, methacrylonitrile, halo ring or side chain styrenes such as $\alpha$-chloro styrene, ortho-, meta- or parachloro styrenes, 2,4-dichloro styrene, 2,3-dichloro styrene 2,5-dichloro styrene or the alkyl side chain styrenes such as $\alpha$-methyl styrene, $\alpha$-ethyl styrene, and the like. Additionally, one can make use of such polymerizable vinyl monomers as acrylamide, methacrylamide, ethacrylamide, ethylenebisacrylamide, N-tertiary-butylacrylamide, and the like.

The anionic polymeric materials containing alcoholic hydroxyl groups may be prepared by using a polymerizable vinyl monomer which contains an alcoholic hydroxyl group such as the hydroxy alkyl esters of $\alpha,\beta$-unsaturated monocarboxylic acids e.g. the hydroxy alkyl esters of acrylic acid, methacrylic, ethacrylic and chloro as well as the other chloro substituted acrylic acids. These esters may either have a primary or a secondary hydroxyl group. Illustrative of the types of compounds that are used to make the copolymers in the anionic, polymeric material are 2-hydroxy-ethyl acrylate, 2-hydroxy-propyl acrylate, 3-hydroxy-propyl acrylate, 2-hydroxy-butyl acrylate, 3-hydroxy-butyl acrylate, 4-hydroxybutyl acrylate, 8-hydroxy-octyl acrylate, 2-hydroxy-ethyl methacrylate, 5-hydroxy-hexylmethacrylate, 6-hydroxy-octylmethacrylate, 8-hydroxy-octylmethacrylate, 10-hydroxy-decylmethacrylate, 3-hydroxy-propyl crotonate, 4-hydroxy-amyl crotonate, 5-hydroxy-amyl crotonate, 6-hydroxy-hexyl crotonate, 7-hydroxy-heptyl crotonate, 10-hydroxy-decyl crotonate, and the like. These hydroxy esters may be used either singly, in combination with one another or with other polymerizable vinyl monomers devoid of any alcoholic hydroxyl group including those set forth hereinabove in the discussion of the carboxyl group-containing monomers. Additionally, one can make use of other hydroxyl-containing polymerizable vinyl monomers such as methylolacrylamide, methylolmethacrylamide, and the like.

Among the amide group-containing monomers which may be used in the preparation of the anionic, water dispersible, polymeric material used in the present invention are acrylamide, methacrylamide, ethacrylamide, and the like. These polymerizable acrylamides may be used to prepare anionic copolymeric materials useful in the present invention with any of the carboxyl group-containing monomers or the hydroxyl group-containing monomers or with any of the copolymerizable monomers set forth hereinabove.

Additionally, one can make use of polyester resin compositions which are water dispersible, non-gelled, anionic polymeric materials. Water soluble alkyd resins or water dispersible alkyd resins, whether oil free or glyceride oil-containing may be used and a plurality of these materials are commercially available and are also well-known in the art. As a consequence, it is not deemed necessary to make any prolonged recitation of such materials since they are fundamentally prepared by reacting a polyhydric alcohol with a polycarboxylic acid or with anhydrides such as phthalic anhydride, maleic anhydride, and the like.

Additionally, one can make use of epoxy esters as the anionic polymeric material in which the epoxy resins, which contain a plurality of hydroxyl groups, are reacted with glyceride oil fatty acids and then further reacted with maleic anhydride to yield a dispersion in an alkaline medium. Still further, one can make use of polyamides which are prepared by reacting alkylene polyamides with excess dicarboxylic acids to produce water soluble and water dispersible, anionic, polymeric materials.

A variety of emulsion anionic polymers may be used in the composition of the present invention, wherein the utilization of a variety of anionic surfactants or emulsifiers such as soaps and alkyl sulfonates are used to impart a charge characteristic to the emulsion particles which will result in the migration of such particles in electric fields. These same surfactants and in combination with a variety of nonionic surfactants can be used to post-emulsify a variety of epoxy esters, saturated and unsaturated alkyd resins and acrylic resins to prepare charged emulsion particles.

In order to illustrate the preparation of an anionic carboxyl group-containing polymer, the following example is set forth in which all parts are parts, by weight, unless otherwise indicated.

CARBOXYL GROUP-CONTAINING POLYMER

Into a suitable reaction vessel equipped with stirrer, thermometer and reflux condenser, there are introduced 100 parts of dioxane. The charge is heated gradually to the reflux temperature by heating on an oil bath. After the dioxane has reached reflux, a mixture of 750 parts of butyl acrylate, 150 parts of acrylic acid and 100 parts of a 1 percent solution of butyl mercaptan in butyl acrylate is introduced in relatively small increments over a 2 hour period. Concurrently but separately, over the same period of time, there are added 12.2 parts of cumene hydroperoxide. After the addition is completed, reflux is continued for about 5 hours. 200 parts of the copolymer thus prepared are dissolved in 220 parts of a mixture of 1 part of concentrated ammonia (29 percent $NH_3$) to 4 parts of water. An additional 80 parts of water are added to give an aqueous solution of 36 percent solids concentration of the copolymer. The solvent dioxane is used in the present example in an amount approximately 10 percent of the total charge. At the end of the polymerization reaction, this solvent may be stripped off under vacuum but it is preferred to leave said solvent in since its removal is not economically justifiable and since this solvent is completely water miscible.

AN ALCOHOLIC HYDROXYL GROUP-CONTAINING EMULSION ANIONIC POLYMER

Into a suitable reaction vessel equipped with a thermometer, stirrer, condenser, and two addition funnels, there are added 440 parts of deionized water, 3.4 parts of sodium bicarbonate, and 2.0 parts of sodium lauryl sulfate. The mixture is heated to about 90° C. whereupon a catalyst solution containing 2.25 parts of ammonium persulfate dissolved in 110 parts of deionized water is prepared and 12 parts of this solution are added to the reaction vessel. This is followed by the addition of 90 parts of said catalyst solution uniformly over a two hour period in comparatively small increments to the reaction vessel. Concurrently, but separately, a monomer mixture of 170 parts of styrene, 235.6 parts of ethyl acrylate, 4.5 parts of acrylic acid and 32 parts of hydroxyethyl methacrylate is added uniformly over the same 2 hour period through a separate funnel. The remainder of the catalyst solution is then added to the reaction vessel and the mixture is heated at 90° C. for an additional 1 hour period. The reaction mixture thus prepared was analyzed and was shown to have a polymer solids of 48 percent.

AMIDE-CONTAINING EMULSION ANIONIC POLYMER

Into a suitable reaction vessel equipped with a thermometer, stirrer, condenser, and two addition funnels, there are introduced 348 parts of deionized water, 1.85 parts of sodium lauryl sulfate, and 4.08 parts of sodium bicarbonate. The reaction mixture is heated to 90° C. whereupon a catalyst solution containing 2.7 parts of ammonium persulfate in 115 parts of deionized water is prepared and 12 parts of this catalyst solution are introduced into the reaction vessel. Thereupon, 90 parts of said catalyst solution are added uniformly in comparatively small increments over a 2 hour period to the reaction vessel. Concurrently during said 2 hour period, but separately, there is added a monomer mixture of 212 parts of styrene, 293 parts of ethyl acrylate, 5.3 parts of acrylic acid, 21 parts of acrylamide, 0.75 part of sodium lauryl sulfate and 348 parts of deionized water over this same two hour period. The remainder of the catalyst solution is then added to the reaction vessel and the mixture is heated at 90° C. for an additional one hour period. The reaction mixture thus prepared was analyzed and revealed a polymer solids of 37.6 percent.

The cationic water dispersible non-gelled polymeric materials used in the composition of the present invention may be any one of a plurality of polymeric materials which have reactive sites that are heat reactive with the guanamine compounds used in the composition of the present invention. As in the anionic materials, these reactive sites may be either carboxyl groups and/or alcoholic hydroxyl groups and/or amide groups, which polymeric materials may be the result of vinyl polymerization. Therefore, all of the polymerizable monomers in each of these three principal classes may be used to prepare the cationic polymeric materials used in the present invention. Still further, these polymerizable monomers may be used with other polymerizable monomers such as the esters, styrenes, nitriles, and the like, all of which have been set forth hereinabove, in significant detail in the discussion of the constitution of the anionic polymeric materials. The guanamine compounds used in the composition of the present invention exhibit good migration characteristics with a wide variety of cationic polymeric materials. These cationic polymeric materials can be broadly described as being selected from any one of the following classes: acrylic polymers, of which a substantial variety are vinyl and acrylic monomers and can be copolymerized with amino acrylates and methacrylates such as dimethylaminoethyl methacrylate, diethylaminoethyl acrylate, and diethylaminoethyl acrylate, and the like. These polymers can be dissolved or dispersed in water with the addition of a water dispersible acid such as hydrochloric acid, acetic acid, and the like. It must be kept in mind that these polymers should also contain some —OH and/or —COOH and/or

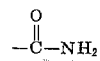

groups which can be obtained by copolymerizing vinyl monomers with comparatively small amounts of such polymerizable monomers as hydroxyethyl methacrylate and/or acrylic acid or acrylamide. In this same broad classification, the amino methacrylates may be replaced by methylvinyl pyridine, and the like. Polymers containing this type of amino monomer can also be water dispersed by the addition of such water dispersible acids such as hydrochloric and acetic acids. The formation of the quaternary amine salt results in the water solubility or water dispersibility.

Another illustrative class of water dispersible, non-gelled polymeric materials carrying a cationic charge, which material is heat reactive with the guanamine compounds, are the reaction products of polyfunctional epoxy compounds (such as the reaction product of isopropylidine-4,4'-bis-phenol with epichlorohydrin) which are then reacted with a polyfunctional amine such as diethylenetriamine, ethylene diamine, iminobispropylamine and the like to yield cationic polymers which can be water dispersed or dissolved upon addition of various water dispersible acids such as hydrochloric or acetic acids. The adjustment of the charged mole ratio of amino to epoxy compound will control the amount of hydroxy groups that will be available for cross-linking with the guanamine compounds.

Another class of water dispersible, non-gelled polymeric material carrying cationic charges which are heat reactive with the guanamine compounds used in the present invention are those prepared by reacting dibasic or tribasic organic acids with polyfunctional amines and with polyols which result in cationic polymers if sufficient polyfunctional amine is used in the initial charge. These polymers will be water soluble or dispersible with the addition of the aforementioned water dispersible acids and the formation of quaternary salts. These cationic polymers will also contain some free hydroxyl and/or carboxyl groups depending on the initial charge. A plurality of such water dispersible acidified polymers are prepared by the condensation of dimer acids with polyfunctional amines wherein the dimer acids are prepared by dimerizing a long chain fatty acid containing ethylenic unsaturation thereby providing a substance which results in the formation of a bridged long chain fatty dicarboxylic acid.

Another class of water dispersible, non-gelled polymeric materials which carry a cationic charge and which are heat reactive with the guanamine compounds used in the present invention are the cationic urea-formaldehyde resins. These condensation products are prepared by reacting urea and formaldehyde with polyfunctional amines to produce cationic resins which are water dispersible upon the addition of a water dispersible acid such as hydrochloric acid or acetic acid. These polymers are cationic and will move to the cathode in an electric field. Still further, these cationic polymers will have free methylol groups available for said reactive cross-linking with the guanamine compounds used in the composition of the present invention.

A further category of water dispersible, non-gelled, polymeric materials which carry a cationic charge and which materials are heat reactive with the guanamine compounds of the present invention are the polyethyleneimines. These polymeric materials are classical cationic polymers when treated with water dispersible acids in an aqueous system. This category of cationic polymers can be provided with reactive alcoholic hydroxyl groups simply by reacting with polyethyleneimine with controlled amounts of ethylene oxide. This modified cationic polymer will then move in the electric field and can be heat reacted with the guanamine compound during the curing reaction.

The following example illustrates a process for preparing a water soluble, cationic, epoxy amine resin.

WATER-SOLUBLE CATIONIC EPOXY AMINE RESIN

A mixture of 400 parts of a resinous reaction product prepared by reacting 4,4'-dihydroxydiphenyldimethylmethane with epichlorohydrin (having an epoxide average equivalency of 487) and 156 parts of tetraethylene pentamine are introduced into 400 parts of toluene at room temperature and then heated to reflux. After refluxing for 1 hour, the toluene and the unreacted tetraethylene pentamine are removed by distillation under reduced pressure finishing at about 175° C. and 3.5 mm./mercury pressure. An aqueous solution containing 30 percent of this resin is obtained by neutralizing the resin with an equivalent amount of dilute acetic acid and has a viscosity of 0.5 poise (Gardner-Holdt) at 25° C.

In the water dispersible, non-gelled, polymeric material carrying either a cationic or anionic charge, the amount of carboxyl groups and/or alcoholic hydroxyl groups and/or amide groups should be at least about 3 percent, by weight, based on the total weight of the polymeric material and not greated than about 30 percent, by weight, based on the total weight of the polymeric material. Preferably, one would use between about 5 percent to about 20 percent, by weight, based on the total weight of the polymeric material of the carboxyl-containing monomer and/or the alcoholic hydroxyl-containing monomer or the amide-containing monomer. These percentages, by weight, prevail whether the individual monomer-containing carboxyl groups, alcoholic hydroxyl groups or amide groups are the sole reactive groups present or whether they are present in any of the above combinations.

It is also within the scope of the present invention to incorporate various additives into our novel compositions. For example, various dyes or pigments, e.g. $TiO_2$; $Fe_2O_3$ etc., can be added so that the coating which results from the electrodeposition process will be colored, e.g. white, red etc.

As before, these examples are set forth primarily for the purpose of illustration and any specific enumeration of detail contained therein should not be interpreted as a limitation on the case except as is indicated in the appended claims. All parts and percentages are by weight unless otherwise indicated.

EXAMPLE 1

Tetrakis(methoxymethyl)benzoguanamine, as prepared in the above example, is dissolved in a 75 percent solution of a malenized polyester in butyl cellosolve. The maleinized polyester was prepared from the reaction product of a polyol, (styrene/allyl alcohol copolymer) tall oil fatty acid and maleic anhydride. A weight ratio of 75/25, polyester to benzoguanamine derivative is used. The quantity of diethylamine necessary to neutralize 35 percent of the available carboxyl groups is added to this solution and the vehicle is diluted to 10% solids by the careful addition of deionized water and vigorous agitation. Untreated steel panels are electrocoated at ambient temperatures at a potential difference of 100V/1 minute. The resultant panels are baked at 350° F. for 20 minutes and the composition determined by the ATR technique described hereinbelow. The film has a weight ratio of polyester to tetrakis(methoxymethyl)benzoguanamine of 80/20, indicating an 80% migration efficiency of the latter.

A panel is then submerged in a 1 percent commercially available detergent solution at 165° F. until blistering is observed. No blistering occurs until 250 hours have elapsed.

A second panel is then scribed with a razor blade, placed in a salt fog cabinet and subjected to a salt spray as defined in ASTM-B-117-62. After 1,000 hours, less than 3 mm. rust creepage from the scribed line is observed.

EXAMPLE 2

The experiment described in Example 1 is repeated in all essential details except that the weight ratio of maleinized polyester to tetrakis(methoxymethyl)benzoguanamine is adjusted to 85/15. Untreated steel panels are electrocoated at 100V/1 minute. The film has a weight ratio of 87/13, polyester to benzoguanamine, indicating an 87 percent migration efficiency of the latter.

EXAMPLE 3

(COMPARATIVE)

The experiment described in Example 2 is repeated in all essential details except that tetrakis(methoxymethyl) propioguanamine is used instead of the benzoguanamine derivative. The bath has a composition of maleinized polyester to propioguanamine derivative of 85/15. The resultant electrocoated panel has a respective weight ratio of 99/1, indicating a propioguanamine migration efficiency of only about 7 percent.

EXAMPLE 4

Tetrakis(methoxymethyl)benzoguanamine is dissolved in a 75 percent solution of an acrylic resin in ethyl cellosolve. The acrylic resin was prepared from the copolymerization of butyl acrylate, styrene and acrylic acid, at a respective weight ratio of 55/30/15. A weight ratio of 75/25, acrylic resin to benzoguanamine derivative is used. The quantity of diethylamine necessary to neutralize 40 percent of the available carboxyl groups is added to this solution and the vehicle is diluted to 10 percent solids by the careful addition of deionized water with vigorous agitation. Untreated steel panels are electrocoated at ambient temperature, at a potential difference of 100V/1 minute. The panels are baked at 350° F./20 minutes and the composition determined by the ATR technique described below. The film has a weight ratio of polyester to tetrakis (methoxymethyl)benzoguanamine of 78/22, indicating an 88 percent migration efficiency of the latter.

EXAMPLE 5

A pigmented enamel is prepared from the maleinized oil described in Example 1. The pigment to binder ratio is adjusted to 30/100 using a commercially available titanium dioxide. The coating bath solids are adjusted to 10 percent and the pH to 8.5. The temperature is controlled at 23° C. Steel panels are electrocoated at 35 V. for three minutes. Analysis of the pigmented film shows a ratio of the maleinized oil to the guanamine compound solids was 75/25, indicating a 100 percent migration of the guanamine compound to the anode.

Following the procedure of Example 1 except that various different guanamines and polymers are employed, metal panels are coated by electrodeposition. The results are set forth in Table I, below.

TABLE I

| Example | Guanamine* R | R' | $R^2$ | $R^3$ | Z | Non-gelled polymer | Wt. ratio polymer to guanamine | Appearance of coating | Detergent resistance | Salt spray resistance |
|---|---|---|---|---|---|---|---|---|---|---|
| 6 | $C_2H_5$ | $C_2H_5$ | $CH_3$ | $CH_3$ | (phenyl) | Tetra polymer: ST/EA/AA/HEM–170/235.6/4.5/ 32–48% solids. | 80/20 | Excellent | Excellent | Excellent |
| 7 | $C_2H_5$ | $C_2H_5$ | $C_2H_5$ | $C_2H_5$ | (phenyl) | Tetra polymer: ST/EA/AA/AM 212/293/5.3/21. | 75/25 | ...do | ...do | Do. |
| 8 | $C_4H_9$ | $CH_3$ | $CH_3$ | $C_4H_9$ | H | Water-dispersible alkyd** | 70/30 | ...do | ...do | Do. |
| 9 | $CH_3$ | $CH_3$ | $C_3H_7$ | $C_3H_7$ | $C_3H_7$ | Maleinized oil | 85/15 | ...do | ...do | Do. |
| 10 | $C_2H_5$ | $CH_3$ | $C_4H_9$ | $C_4H_9$ | $CH_3$ | Epoxy-amine resin prepared as shown above. | 80/20 | ...do | ...do | Do. |
| 11 | $C_2H_5$ | $CH_3$ | $CH_3$ | $CH_3$ | $C_8H_{17}$ | Same as Ex. 1 | 75/25 | ...do | ...do | Do. |
| 12 | $CH_3$ | $CH_3$ | $CH_3$ | $CH_3$ | $H_3C$–(phenyl) | Same as Ex. 6 | 90/10 | ...do | ...do | Do. |
| 13 Comparative | $CH_3$ | $CH_3$ | $CH_3$ | $CH_3$ | $CH_3$ | Same as Ex. 8 | 90/10 | (¹) Poor | | Poor |

Code for Table I:
¹ Poor, patchy, less than 5% effective.
*According to Formula I, above.
**Produces from stearic acid, trimellitic anhydride, phthalic anhydride and a styrene/allyl alcohol copolymer.
ST = Styrene.
EA = Ethyl acrylate.
AA = Acrylic acid.
HEM = Hydroxyethyl methacrylate.
AM = Acrylamide.

In the above electrodeposition studies, the coating bath was prepared at about 10% solids (ionic polymeric material plus guanamine compound) for both clear and pigmented formulations at the pHs and temperatures stated. The films were deposited on steel or aluminum panels using a Ransburg electrocoating apparatus. The potential difference in voltage and times of exposure are stated. In each instance, the panels were washed under a stream of water and baked at about 300° F. for about 30 minutes. The composition of the electrodeposited films was determined by the use of attenuated total reflectance (ATR) infrared spectroscopy. ATR spectroscopy were run on 2 × 3 cm. pieces of the coated panel and calibration curves were prepared by plotting the reflective loss ratio of the triazine band at 815 cm.$^{-1}$ to the carboxyl band 1740 cm.$^{-1}$ against the guanamine compound concentration. A Beckman IR-4 spectrophotometer with an ATR attachment having a KRS-5 prism (Connecticut Instrument Company, Wilton, Connecticut) was used for these measurements. Calibration curves were determined for both clear and pigmented formulations. The reflective loss of the electrodeposited films was measured and the percent migration of the guanamine compounds is determined from the respective calibration curve.

When the compositions of the present invention are used to deposit electrically the coatings of the present invention on electroconductive metallic articles, the compositions may be diluted with water to concentrations varying between about 3 percent and 30 percent and, preferably, between about 7 percent and 15 percent total resins solids.

We claim:
1. In a process for electrocoating films on metal, the improvement which comprises immersing said metal in an aqueous dispersion comprising a mixture of from about 5 percent to about 40 percent, by weight, of (A) a mixture of substantially waterinsoluble, substantially fully etherified tetramethylol guanamines containing at least 13 carbon atoms, on the average, exclusive of those in the triazine ring and, correspondingly, from about 95 percent to about 60 percent, by weight, of (B) a water-dispersible, non-gelled, polymeric material, carrying an ionic charge which polymeric material contains at least one class of reactive groups selected from the group consisting of carboxyl groups, alcoholic hydroxy groups and amide groups, wherein the amount of said groups is at least about 3 percent, by weight, and not more than about 30 percent, by weight, based on the total weight of said polymeric material, wherein said groups are heat reactive with (A), and wherein said percentages of (A) and (B), by weight, total 100 percent and are based on the total solids weight of (A) and (B) and subjecting the aqueous dispersion to electrophoresis in order to deposit the mixture of (A) and (B) on the metal as an adherent film.
2. A process according to claim 1 in which the aqueous dispersion is alkaline and in which the water dispersible, non-gelled, polymeric material carries an anionic charge.
3. The process according to claim 2 in which said anionic, polymeric material contains carboxyl groups.
4. The process according to claim 2 in which said anionic, polymeric material contains hydroxyl groups.
5. The process according to claim 2 in which said anionic, polymeric material contains amide groups.
6. A process according to claim 1 wherein said dispersion contains, in addition to (A) and (B), (C) at least one pigment.

* * * * *